United States Patent
Greenwald et al.

(10) Patent No.: US 7,861,625 B2
(45) Date of Patent: Jan. 4, 2011

(54) DYNAMIC ALIGNMENT MONITORING SYSTEM FOR ON-VEHICLE DISK BRAKE LATHE

(75) Inventors: Christopher L. Greenwald, Waban, MA (US); Jeffrey P. Hastings, Hanover, NH (US)

(73) Assignee: Pro-Cut Licensing Company, LLC, West Lebanon, NH (US)

(*) Notice: Subject to any disclaimer, the term of this patent is extended or adjusted under 35 U.S.C. 154(b) by 279 days.

(21) Appl. No.: 12/257,429

(22) Filed: Oct. 24, 2008

(65) Prior Publication Data

US 2009/0107309 A1  Apr. 30, 2009

Related U.S. Application Data

(60) Provisional application No. 60/982,763, filed on Oct. 26, 2007.

(51) Int. Cl.
  *B23B 25/06* (2006.01)
  *B23B 5/04* (2006.01)
(52) U.S. Cl. .......................... 82/112; 82/118
(58) Field of Classification Search ............... 82/118, 82/112, 903, 104; 33/609, 610; 73/66, 461, 73/460, 462
  See application file for complete search history.

(56) References Cited

U.S. PATENT DOCUMENTS

| | | | | |
|---|---|---|---|---|
| 4,170,896 A | * | 10/1979 | Korkosz | 73/66 |
| 4,238,960 A | * | 12/1980 | Curtis et al. | 73/462 |
| 4,381,672 A | * | 5/1983 | O'Connor et al. | 73/504.15 |
| 5,214,585 A | * | 5/1993 | Ehrich | 73/462 |
| 5,922,952 A | * | 7/1999 | Moradi et al. | 73/462 |
| 5,974,878 A | * | 11/1999 | Newell et al. | 73/462 |
| 6,101,911 A | | 8/2000 | Newell et al. | |
| 6,789,422 B1 | * | 9/2004 | Ward, Jr. | 73/462 |
| 6,813,979 B2 | | 11/2004 | Caorle | |

\* cited by examiner

*Primary Examiner*—Will Fridie, Jr.
(74) *Attorney, Agent, or Firm*—Michael J. Weins; Jeffrey E. Sempreban (57) ABSTRACT

A dynamic alignment monitoring system allows an operator to monitor the misalignment of an on-vehicle disk brake lathe with respect to a vehicle axis about which the disk to be machined rotates, and can allow the operator to discontinue further alignment when appropriate in order to speed the overall time of the alignment process. The system processes signals from an angular rate sensor and a tachometer, using a scaling routine to derive a LRO value corresponding to the LRO of the disk which would result from machining in the current alignment condition. A representation of the derived LRO value is displayed to the operator. An operator override can allow the operator to discontinue further alignment adjustments when an acceptable alignment condition is indicated. The system can aid the operator by also presenting a representation of an acceptable LRO value for the particular vehicle being serviced.

18 Claims, 9 Drawing Sheets

DYNAMIC ALIGNMENT MONITORING SYSTEM FOR ON-VEHICLE DISK BRAKE LATHE

FIELD OF THE INVENTION

The present invention relates to on-vehicle disk brake lathes which have a dynamic alignment system for automatically reducing misalignment of the lathe with respect to a wheel hub to which the lathe is mounted.

BACKGROUND OF THE INVENTION

On-vehicle disk brake lathes are employed to periodically resurface disk brake rotors to assure proper functioning of the vehicle brakes, and allow the brake disk to be machined without removal from the wheel hub to which the brake disk is mounted. To assure that lateral runout of the disk is reduced sufficiently to meet vehicle specifications, the lathe has an alignment mechanism to substantially align a rotational axis of the lathe with the axis of rotation of the wheel hub on which the brake disk is mounted. Since the lathe machines the surfaces of the brake disk along a path normal to the lathe axis, misalignment of the lathe axis with the axis of rotation introduces undesirable lateral runout in the machined brake disk when rotated about the wheel hub axis; thus, the misalignment of these axes should be reduced to be sufficiently small that the resulting lateral runout of the machined disk is within the manufacturer's specifications. Currently, two approaches have been taken to automatically reduce the misalignment between the lathe axis and the hub axis.

U.S. Pat. No. 6,101,911 teaches a trial-and-error approach for adjusting an alignment mechanism, where the positions of a pair of opposed slant disks are incrementally adjusted to change the magnitude and orientation of the angle between the hub axis and the lathe axis. An alignment signal generated by a rotational accelerometer is monitored to see whether each change reduces or increases the misalignment. If the change increases the misalignment, then the change is reversed and either a countering change made or, if that particular disk movement has already been adjusted, then the other disk position is adjusted. This trial-end-error adjustment is continued until such time as the alignment signal reaches a signal level that is consistent with an acceptable degree of lateral runout in the brake disk. If such a level cannot be achieved after a specified time period or after a specified number of attempts, then a notice of such condition is provided to the operator.

An alternative approach is taught in U.S. Pat. No. 6,813,979, where the lateral runout due to misalignment is measured and an adjustment to correct the misalignment is calculated based on the lateral runout measurement. The adjustment is automatically performed by adjusting the relative extensions of three radially-arranged adjustment elements interposed between two disks. To measure the lateral runout used to calculate the needed adjustment, the '979 patent employs a feeler-type probe which is taught as providing an authentic representation of lateral runout to overcome some of the problems pointed out with the use of indirect measurement, such as by use of an accelerometer as taught in the '911 patent.

SUMMARY OF THE INVENTION

A dynamic alignment monitoring system is described for use with an on-vehicle disk brake lathe that employs a dynamic alignment system using a trial-and-error scheme to adjust the alignment, such as described in U.S. Pat. No. 6,101,911 and incorporated herein by reference. The system can optionally be provided with an operator intervention option that allows the operator to selectively stop further adjustment of the alignment when appropriate. Such trial-and-error systems are felt to provide a benefit over determinative lathe systems such as taught in U.S. Pat. No. 6,813,979 that require the system be initialized by the operator, which makes the alignment process time consuming and also subject to operator error. The dynamic alignment system of the present invention provides an advantage over earlier trial-and-error systems in that it provides the operator with a real-time representation of current state of misalignment during the alignment process.

The system of the present invention monitors misalignment between a lathe axis and a brake disk axis with the use of a high sensitivity angular velocity or angular acceleration sensor (hereafter referred to as an angular rate sensor, whether measuring angular velocity or angular acceleration). An angular rate sensor is employed because it ignores any motion other than rotation and is not dependent on being mounted at a particular position on the lathe body. The employment of a high sensitivity angular rate sensor overcomes some of the limitations of earlier accelerometers, such as the limitations pointed out in the '979 patent, and assures sufficient responsiveness to allow derivation of an accurate representation of the lateral runout that would result from machining the brake disk under the current condition of misalignment. These high sensitively angular rate sensors, when used with other features of the system, allow an operator to monitor the misalignment in real time, and in some embodiments provide the operator an option to discontinue further automatic adjustment of the alignment when, in the operator's judgement, further adjustment is not necessary. When such an option is present, it allows the operator to selectively stop the automatic alignment process can reduce the time for the alignment.

High sensitivity angular rate sensors as defined in the present application are sensors having a very high degree of repeatability in their response, and where the response can be accurately correlated to changes in the angular velocity or angular acceleration. Angular rate sensors generally do not do not provide this combination of properties; however, it is possible to provide an improved sensor by preselecting an angular rate sensor that provides a high degree of repeatability (low standard deviation $\sigma$ in its response) and coupling the selected sensor to an addressable scaling routine which can be calibrated to provide an individually scaled output indicative of the lateral runout that the sensor is monitoring.

The high degree of repeatability is attained by selecting sensors that have a very low standard deviation $\sigma$ in their response to a constant signal. The standard deviation $\sigma$ of the sensor selected should be sufficiently low that it remains small in proportion to the signal level even when the lateral runout, and hence the resulting signal level from the sensor, is very small. Since lateral runout adjustment is a minimizing function, it has been found practical to employ sensors with a standard deviation $\sigma$ of not more than about 7.5% of the signal level when the lateral runout is in the range of 0.001" measured at a radius of six inches from the axis of rotation; this value of lateral runout is smaller than that typically set by manufacturers for lateral runout specifications and is in the range of the lateral runout values typically used as a cutoff point for further adjustment in automatic alignment systems. Thus, for monitoring in situations where lateral runout values less than 0.001" are expected, the standard deviation value $\sigma$ should be no greater than the signal level that would correspond to a lateral runout of 0.000075".

The selection of an angular rate sensor having a low standard deviation allows the response of the sensor to closely track the angular rate as a function of time, such that the output signal from any sensor falling within these limitations provides a phase-accurate depiction of the angular rate over time where the amplitude is closely proportional to the angular rate. If the frequency of the rotation is known, the amplitude for the angular rate can then be correlated to a maximum displacement corresponding to the angular motion; the frequency is typically determined by monitoring a tachometer that responds to the rotation of a spindle of the brake lathe.

The signals from the angular rate sensor and the tachometer are processed by an alignment signal processing routine to convert the angular rate signal to a signal indicating maximum displacement, and a scaling routine applies an appropriate scaling factor to provide a value that scales proportionally to the lateral runout (measured at a specified radius from the axis of rotation) that would result from machining the brake disk under the current alignment condition. The scaling routine used to obtain this derived LRO value can operate on the angular rate signal either prior to or after processing by the alignment signal processing routine, or can be incorporated into the alignment signal processing routine.

The derived LRO value is represented on a display to provide the operator with a real-time indication of the current state of misalignment of the lathe, expressed in terms of the lateral runout that would be present in the machined brake disk. In many cases, this presentation is in the form of a numerical display of the lateral runout value that would result from machining the brake disk under the current alignment condition.

It has been found that angular rate sensors having a sufficiently small standard deviation generally do not have a uniform response from one individual sensor to another in the strength of the output signal; thus, while the output signal closely resembles a graph of the angular rate over time, the scale of that graph varies between different sensors, and the scale for a particular sensor is not known with sufficient precision to provide useful data for determining a value which represents an accurately proportional value for the lateral runout that would be caused by the misalignment when the brake disk is machined. For such angular rate sensors, the scaling routine should be dedicated to the particular angular rate sensor employed, and should operate using an individual scaling factor stored in a memory that is associated with the particular angular rate sensor. To determine the appropriate scaling factor for any particular sensor, the individual scaling factor for use by the scaling routine when processing the signal from the particular sensor employed is established through a calibration process and is stored in the memory associated with the sensor; the stored scaling factor can be considered a part of an addressable scaling routine and memory which is dedicated to the particular angular rate sensor, and this combination of angular rate sensor and its associated addressable scaling routine and memory form a composite sensor which forms one aspect of the present invention.

To establish an appropriate value for the scaling factor to be stored in the memory and used by the addressable scaling routine, the angular rate sensor can be calibrated by attaching the particular sensor and associated circuitry to a calibration jig that has a known amount of lateral runout. The calibration jig is operated by rotating an element of the jig using a motor to generate angular motion due to the lateral runout in the calibration jig. The output signal from the particular angular rate sensor and the signal from a calibration tachometer that responds to the motor speed of the calibration jig are processed to derive a lateral runout value, which can then be compared to the known lateral runout of the calibration jig. Based on this comparison, an appropriate scaling factor value to be used by the addressable scaling routine to conform the derived lateral runout (LRO) value to the known lateral runout is calculated. This scaling factor is then written into the memory of the addressable scaling routine associated with the angular rate sensor. To further refine the scaling factor, the procedure can be repeated with the scaling routine using the stored scaling factor to allow an alignment signal processing routine to convert the signals from the angular rate sensor and the calibration tachometer to a new derived LRO value, which is compared to the known lateral runout of the calibration jig and used to calculate a new scaling factor based on this comparison, this new scaling factor being written into the memory to replace the earlier value. In this manner, the scaling factor can be iteratively refined until it results in a derived LRO value that is sufficiently close to the known value. Once the scaling factor has been established in the memory for that particular angular rate sensor, the sensor and the associated memory can thereafter be employed in a lathe to allow the derivation of a proportional lateral runout value based on the scaling factor, the misalignment of the lathe, and the rotation frequency of the lathe rotation which can be obtained from a tachometer on the lathe.

The dynamic alignment monitoring system of the present invention includes an alignment control routine and dynamic alignment mechanism, which can be operated in a conventional trial-and-error manner to automatically reduce the misalignment by determining whether adjustments act to increase or decrease the misalignment and making further adjustments accordingly until the misalignment has been reduced to a specified degree as indicated by the character of the signal output by the alignment signal processing routine. While such automatic alignment could be performed using output of the alignment signal processing routine which is not scaled so as to be proportional to the lateral runout, the high sensitivity angular rate sensor that is employed in the present monitoring and intervention system can allow the signal processing routine to output an accurately proportional derived LRO value that should provide greater assurance that the automatic alignment procedure results in a sufficient reduction in the misalignment that the machined disk will meet manufacturer specifications, as well as possibly speeding alignment times by providing a more accurate basis for evaluating whether adjustments act to increase or decrease the misalignment. In any case, while the alignment reduction can be performed automatically as in earlier systems, some embodiments of the system of the present invention allow the operator to selectively interrupt the automatic process when appropriate to allow machining the brake disk without waiting for further adjustments to be made.

As noted above, the derived LRO value obtained by processing the angular rate signal and the tachometer signal is represented on the display so that the operator can visually monitor the progress of the alignment process; the display can be a digital or analog representation of the derived LRO value. A more comprehensive monitoring and intervention system could display the derived LRO value as function of time or as an array of the last n derived values for comparison with the current derived LRO value. The screen could also present a graphic output indicating the derived LRO value, preferably in combination with a digital (numerical) presentation of the derived LRO value.

When the system is designed to allow the operator to manually cause the adjustment procedure to be discontinued when the displayed state of alignment indicates, in view of the operator's judgement, that such premature cessation of the adjustment is desirable, an operator override is provided to form an alignment monitoring and intervention system. The monitoring and intervention system can also present additional information on the display to assist the operator in interpreting the displayed representation of the derived LRO value to determine when it is appropriate to discontinue the alignment process. The display can present a target value for the lateral runout entered by the operator, such information being available from the vehicle manufacturer. In more comprehensive monitoring and intervention systems, the system communicates with a database of specification information for the available vehicle models and the monitoring and intervention system is provided with an operator interface which allows the operator to select information relevant to the vehicle on which the brake disk is to be serviced from the database. In such cases, the monitoring and intervention system can use the vehicle/wheel information to select appropriate specification information from the database and provide a display of a target lateral runout value that is appropriate for the particular vehicle and wheel position to assist the operator in making the decision as to whether to take control based on a comparison of the current derived LRO value to the target value.

In a preferred embodiment, the monitoring and intervention system provides a comparison routine that compares the current derived LRO value to the appropriate LRO specification and provides an indication on the display as to whether the current derived LRO value meets the tolerances allowed by the specification for the selected vehicle and wheel position.

As noted above, the operator-activated operator override allows the operator to cause the dynamic alignment process to cease when determined to be appropriate based on the information provided on the display. When the operator override is used, further adjustment by the dynamic alignment mechanism is discontinued. However, it is preferred that the monitoring and intervention system provide a post-alignment-operation intervention check to assure that adjustments did not occur after the presentation of the alignment relied on by the operator when making the switching action.

BRIEF DESCRIPTION OF THE FIGURES

As illustrated in FIG. 5, the composite angular rate sensor is mounted in a lathe circuit that is attached to a calibration jig which generates a controlled angular motion. As the calibration jig is operated, an alignment signal processing routine provides a derived LRO value in response to the scaled signal from the angular rate sensor and the addressable scaling routine, and a calibration computer compares the derived LRO value to a known LRO of the calibration jig to determine an appropriate adjustment to the individual scaling factor for storage in the memory of the addressable scaling routine.

FIGS. 11-14 illustrate examples of displays that would be suitable for the system shown in FIG. 9. In addition to providing a graphic representation of the current derived LRO value, these displays provide various graphic representations of data associated with the state of alignment, including a representation of an appropriate specification value selected from the database.

DETAILED DESCRIPTION OF THE PREFERRED EMBODIMENTS

Figure 1:
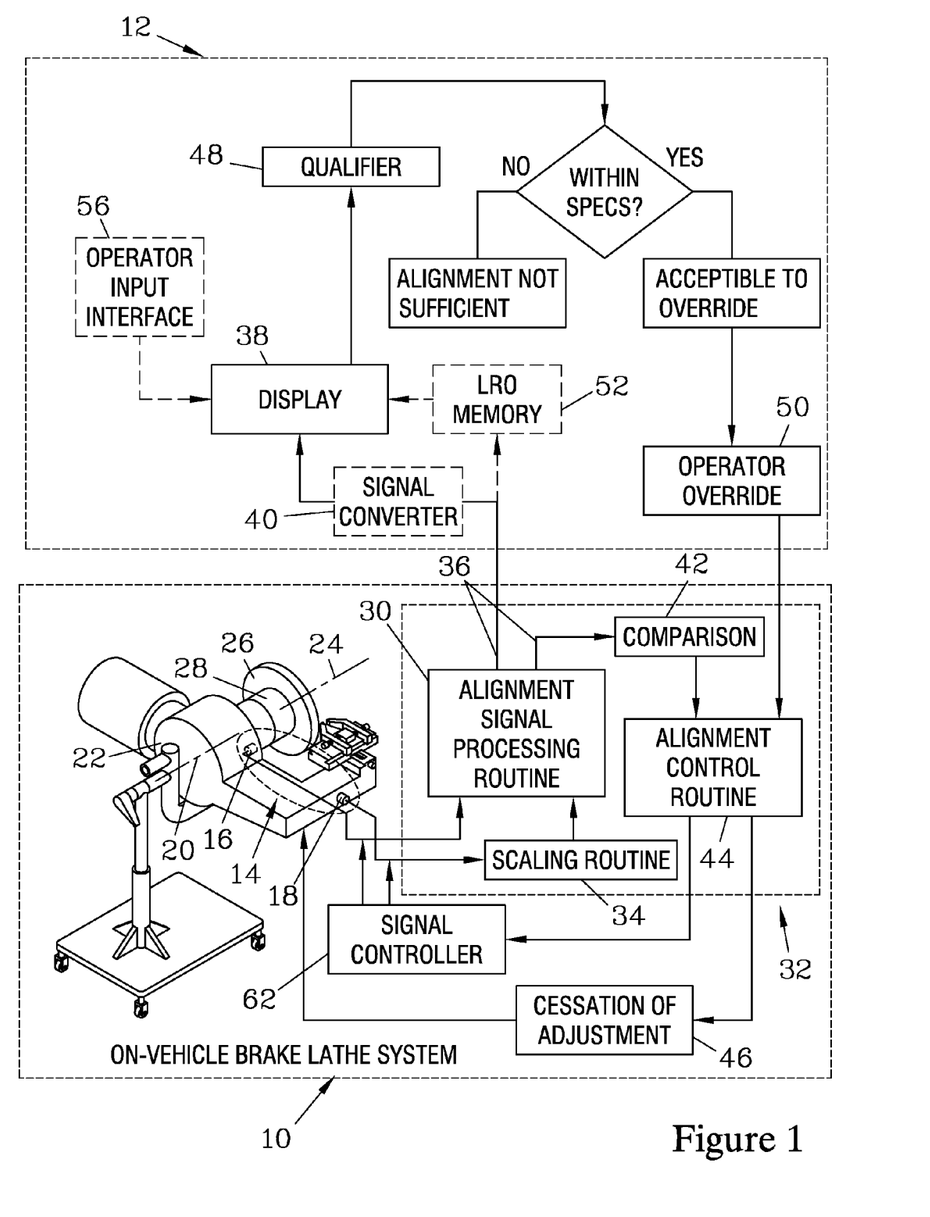
FIG. 1 is a schematic representation of one embodiment of a dynamic alignment monitoring and operator intervention system of the present invention, which employs a high sensitivity angular rate sensor and an alignment signal processing routine which operates on the output from the angular rate sensor using a scaling routine to derive a lateral runout (LRO) value corresponding to the current state of alignment of an on-vehicle disk brake lathe as a function of time. This derived LRO value is represented on a display to allow the operator to view the progress of the dynamic alignment system and to selectively stop the alignment process if the displayed derived LRO value indicates that the misalignment is sufficiently small for the particular brake disk of a vehicle wheel to be machined to meet specifications. This monitoring and intervention system is shown with optional functions allowing the operator to input reference information to be presented on the display and a memory for allowing recent values to be displayed to aid the operator in establishing trends.

FIG. 1 is a schematic representation of an on-vehicle disk brake lathe system 10 with a dynamic alignment monitoring and operator intervention system 12 which forms one embodiment of the present invention. The on-vehicle brake lathe system 10 has alignment sensors 14 which include a tachometer 16 and an angular rate sensor 18. The angular rate sensor 18 needs to have a high degree of repeatability and calibrated output so as to provide sufficient sensitivity to be responsive on a real time basis and allow an accurate time-dependant tracking signal which provides signals, as a function of time, that result from the misalignment between a lathe axis 20 of an on-vehicle disk brake lathe 22 and a disk axis 24, which is the axis of rotation of a brake disk 26 and a wheel hub 28 to which the lathe 22 is attached. Angular rate sensors having sufficient sensitivity are referred to hereafter as high resolution angular rate sensors.

When the angular rate sensor 18 is selected to be a high resolution angular rate sensor, independent of its details, the signals that it generates as well as the signal from the tachometer 16 are provided to an alignment signal processing routine 30, which forms part of a lathe computer 32. The alignment signal processing routine 30 processes the signals and employs a scaling routine 34 to provide an alignment indication signal 36 that is a time-dependent value which is a known proportion of the lateral runout that would result from machining the brake disk 26 based on the current misalignment. While the scaling routine 34 is shown in FIG. 1 as operating on the signal from the angular rate sensor 18 prior to the signal being provided to the alignment signal processing routine 30, it should be appreciated that the scaling operation could be done after such processing, or the scaling routine could be an integral part of the alignment signal processing routine.

The scaling routine 34 can be selected such that the alignment indication signal 36 is formatted differently than lateral runout value that would result, since it is more practical in some cases for the scaling routine 34 to be selected such that the alignment indication signal 36 is a scaled value proportional to the lateral runout; for example, the alignment indication signal 36 may be scaled to allow the alignment signal processing routine 30 to operate using integers, rather than fractions. The lathe computer 32 can reside on the lathe 22 or, alternatively, can be a remote computer such as a laptop computer that communicates with the brake lathe 22; preferably, such communication is performed using Bluetooth™ or other wireless technology.

Figure 2:
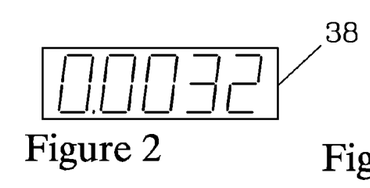
FIG. 2 is an illustration of a visual display that can be provided by the system shown in FIG. 1 where a numerical representation of the current derived LRO value is shown to the operator.

The monitoring and intervention system 12 includes a display 38 which, at a minimum, displays a visual representation of the derived LRO value indicated by the alignment indication signal 36 provided by the alignment signal processing routine 30 as a function of time (depending on the formats of the alignment indication signal 36 and the display 38, the alignment indication signal 36 may need to be converted to a format compatible with the display 38 by a signal converter 40. In a simple form, visual representation on the display 38 could be a digital (numerical) display of the current derived LRO value, as shown in FIG. 2; where the alignment indication signal 36 is a scaled proportion of the LRO value, it should be appropriately rescaled to represent the actual LRO value before being displayed.

While output from the alignment signal processing routine 30 could be used to automatically reduce the misalignment in a trial-and-error method without being scaled to the lateral runout but rather being a raw signal, in the embodiment illustrated in FIG. 1 the alignment indication signal 36 which is a proportional derived LRO value is provided to a comparison routine 42 and is compared to a standard lateral runout value which should meet specifications for lateral runout (LRO) for all vehicles expected to be serviced. If the comparison is such that the alignment indication signal 36 corresponds to an unacceptably large degree of misalignment, then an alignment control routine 44 provides instructions to the lathe 22 to automatically adjust the alignment between the axes (20, 24) in a trial-and-error manner to reduce the misalignment. While the trial-and-error reduction of misalignment is not dependent on the high resolution of the signal, the high resolution can improve the speed of the alignment procedure by providing a more accurate indication of whether a small adjustment results in a reduction or an increase in the misalignment.

When the comparison performed by the comparison routine 42 provides the result that the alignment indication signal 36 corresponds to an acceptable LRO value, then the alignment control routine 44 activates a cessation of adjustment routine 46 that ceases any further adjustment of the alignment of the brake lathe 22, effectively maintaining it in its current alignment configuration, as well as providing a notice to the operator that the machining of the disk 26 can be initiated such as by illuminating a "ready to cut" light on the lathe 22.

While the trial-and-error scheme for reducing misalignment such as employed in prior art lathes, such as taught in U.S. Pat. No. 6,101,911, has been found effective, it may result in excessive time periods for reducing the misalignment to an acceptable degree, since the process does not treat the dynamics of the settling down of the alignment process, and does not allow for less stringent alignment requirements on some vehicles. It also does not provide any information to the operator in situations where reaching of the final value is particularly slow or cannot be attained. The use of the monitoring and intervention system 12 allows the operator to observe the real-time dynamics of the alignment and evaluate what lateral runout would be present in the brake disk 26 if machined under the current state of alignment. The monitoring and intervention system 12 also allows the operator to assess the manner of convergence to the limiting value and, in some cases, do limited diagnostic checks on the state of repair of the alignment system. If, for example, the level of misalignment plateaus without reaching an acceptably small amount, the operator is placed on notice that there may be a loose connection.

The monitoring and intervention system 12 includes the capability to allow the operator to selectively stop further adjustments of the alignment when appropriate. The operator can compare the derived LRO value represented on the display 38 with a qualifier 48 which, in the most elementary form, is determined by the operator from collected available data. Based on this comparison, the operator can either take no action or can operate an operator override 50 to disengage the control of the alignment mechanism of the brake lathe 22 and, at that point, maintain the brake lathe 22 its current alignment configuration. In the monitoring and intervention system 12 illustrated, stopping is done by causing the alignment control routine 44 to activate the cessation of adjustment routine 46.

It should be noted that real-time monitoring of the lateral runout during alignment based on the signal from an angular rate sensor has not been practical, as has been pointed out in the U.S. Pat. No. 6,813,979. Thus, even without the ability to terminate the process by the operator, the current system can provide the operator with confidence that the alignment has been sufficiently reduced that the brake disk, when machined, will meet specifications. The '979 patent teaches that the LRO as measured by a feeler-type gauge can be displayed during alignment; however, to do so the system must provide a reference surface for such a gauge that is sufficiently parallel to the plane in which the disk surfaces will be cut that the LRO measurement will be meaningful. This requirement would appear to make such a display impractical. Furthermore, such a feeler-type gauge would be subject to vibrations of the lathe and the reference surface due to translational motion (radial runout) during the alignment process, and thus any LRO value provided would be suspect.

When the system of the present invention allows the operator to selectively stop further adjustment of the alignment, it can be helpful to continue to display the visual representation of the derived LRO value after the cessation of adjustment routine has been activated to assure that the operator can readily determine that the signal has not again risen above the acceptable value, such as discussed below with regard to FIGS. 7-9.

While not essential for the operation of the monitoring and intervention system 12, it is helpful to provide additional information on the display 38 to assist the operator in determining whether it appears appropriate to discontinue further refinement of the alignment, rather than relying solely on the operator's experience. This allows the operator to make evaluations while viewing the display 38 without the need to refer to supplemental information elsewhere as to whether it is appropriate to activate the operator override 50.

For such a monitoring and intervention system 12 as defined above, the display 38 provides a visual output which changes as a function of time during the alignment process and which can be visually monitored by the operator, who should be watching for trends as the derived LRO value remains within a specified range of runout that is acceptable for the final surfacing required for the particular vehicle and wheel position.

Figure 3:
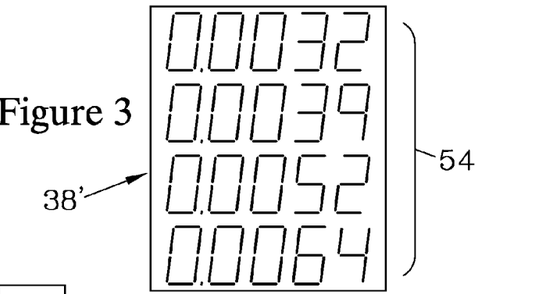
FIG. 3 shows an alternative display, where the monitoring and intervention system has an optional LRO memory and the display presents numerical representations of the current derived LRO value as well as several immediately previous derived LRO values to the operator.

The ease with which the trends can be identified can be enhanced if the dynamic alignment monitoring and operator intervention system 12 has an LRO memory 52 (shown as an optional element in FIG. 1), in which the last n values of the instantaneous derived LRO values can be stored, and a routine which displays an array 54 on the display 38', as illustrated in FIG. 3. The displayed array 54 will provide a visual presentation which can, in part, provide the qualifier 48 to assist the operator in evaluating the likelihood of the values taking a significant excursion as they continue work their way toward better alignment.

Figure 4:
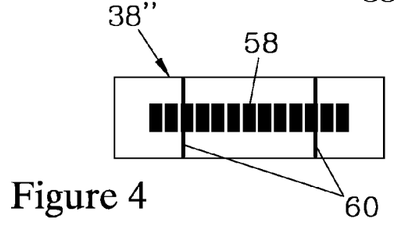
FIG. 4 shows another alternative display, where the current derived LRO value is represented graphically, and where the monitoring and intervention system has an operator input interface (illustrated as an option feature of the embodiment of FIG. 1) to allow the operator to input an appropriate LRO specification target value for the particular vehicle wheel to be machined. This inputted LRO specification target value is graphically represented for direct comparison with the graphically-represented current derived LRO value to aid the operator in determining when the currently-derived LRO value is within the specification.

To further assist in interpreting the derived LRO values indicated on the display 38, additional qualifier information can be provided to the display 38 by providing an operator input device 56 which will allow the operator to tailor the content shown on the display 38 so that it will display other information which will simplify the interpretation of the data. FIG. 4 illustrates an alternative display 38" that can be helpful in interpreting the alignment indication signal 36. In this embodiment, the signal converter 40 (shown as an optional element in FIG. 1) has the capability to convert the alignment indication signal 36 into a graphic for presentation on the display 38", which in this embodiment is provided with a graphable segment 58 where the proportional derived LRO value indicated by the alignment indication signal 36 can be graphically represented as a function of time to provide a bar graph; in the example shown, the graphable segment 58 increases and decreases in width extending from the center, the width of the graph changing proportionally with the increase and decrease of the derived LRO value indicated by the alignment indication signal 36. Markers 60 are supplied that can be adjusted via the operator input device 56 to graphically represent a target LRO value, the separation of the markers 60 from the center corresponding to the appropriate LRO specification value for the particular vehicle and wheel to be machined using the same scale as used to define the width of the graphable segment 58. This graph can provide a pulsating bar extending outward from the center and, when the pulsation keeps within the markers 60, it should be reasonable for the operator to stop the alignment process by using the operator override 50. While such graphic displays can be helpful to the operator in evaluating the current state of alignment, it is generally preferred to also display a numerical representation of the derived LRO value to the operator.

In the embodiment illustrated in FIG. 1, the monitoring and intervention system 12 and the lathe system 10 are designed such that the alignment either goes to the default limit, at which time the monitoring of the misalignment is stopped or, alternatively, the operator can optionally cut off the alignment process prematurely and, when such is done, monitoring of the misalignment is stopped when the operator decision is made to override. When the alignment process is automatically stopped, the signals from the alignment sensors 14 are typically suppressed, either by the cessation of adjustment routine 46 or directly by the alignment control routine 44 (as shown in FIG. 1), since information on the state of misalignment is no longer needed to provide a basis for the alignment control routine 44 to make further adjustments. In this embodiment, suppression of the signals is performed by a signal controller 62 that interrupts transmission of the signals to the alignment signal processing routine 30, and the alignment sensors 14 are also deactivated when the adjustment process is stopped by the use of the operator override 50. It should be appreciated that other approaches to suppressing the signals from the alignment sensors to cease the time-dependent presentation on the display could be employed.

When the misalignment has been reduced to the point where it is appropriate for the operator to override the alignment process, the adjustments made are typically relatively small, and thus do not typically change drastically over a short time period. However, there is still some risk in this scheme that the decision can be made to stop before the current status is reported and this, combined with the reaction time for the operator to actually activate the operator override 50 after deciding to do so, make it possible that a further automatic adjustment may cause the derived LRO value to exceed the acceptable range of misalignment since last reporting the value, and thus the operator's decision may result in an inappropriate state of alignment. To overcome this risk, the dynamic alignment monitoring and operator intervention system can be designed to continue to display the derived LRO value for at least a short time after the cessation of alignment routine 46 has been activated, so that the operator will be provided notice in the event that the misalignment increases to such a degree that the brake disk would no longer meet the specification if machined under the current alignment condition. Schemes for continuing the display of the derived LRO value to allow the operator to confirm the misalignment is sufficiently small are discussed below with regard to FIGS. 7-9.

While the details of the nature of the high resolution angular rate sensors to be employed are discussed above without reference to a particular class of angular rate sensors, it has been found that Coriolis-type angular rate sensors as a class are particularly advantageous in simplifying the operation of the alignment signal processing routine, since the output of such sensors is independent of any translational component of the motion of the device they are monitoring.

While Coriolis-type angular rate sensors have the inherent advantages over other sensors, as a class they do not provide the high resolution required. These sensors as a class either are subject to broad deviation in their response or, in the alternative, broad variation in the proportionality of their response. Currently available Coriolis-type angular rate sensors selected from the group of sensors that have the desired degree of repeatability typically vary significantly in their response from sensor to sensor, and thus the appropriate scaling factor to be employed by the scaling routine to allow the alignment signal processing routine to provide an output signal that is an accurately proportional representation of the lateral runout value needs to be adjusted for the particular angular rate sensor to be employed.

Figure 5:
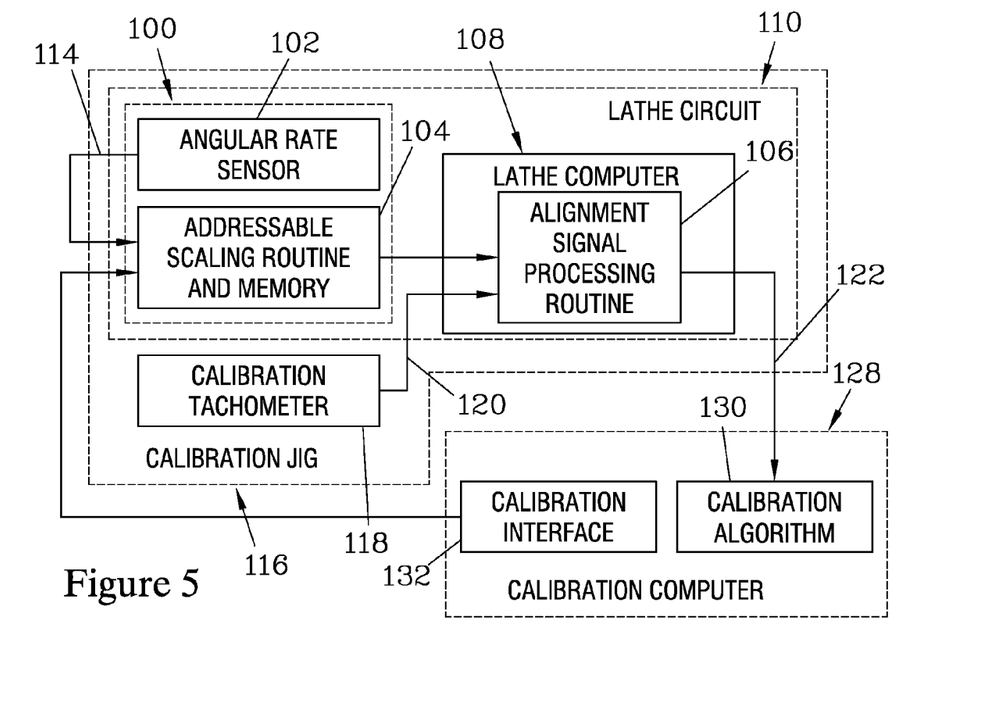
FIG. 5 shows one embodiment for a composite angular rate sensor of the present invention that has an angular rate sensor which is associated with an addressable scaling routine having a memory for storing an individual scaling factor associated with that angular rate sensor. The angular rate sensor and the associated addressable scaling routine can be set to provide a calibrated output that can be processed along with a tachometer signal to obtain an accurate LRO value.
Figure 6:
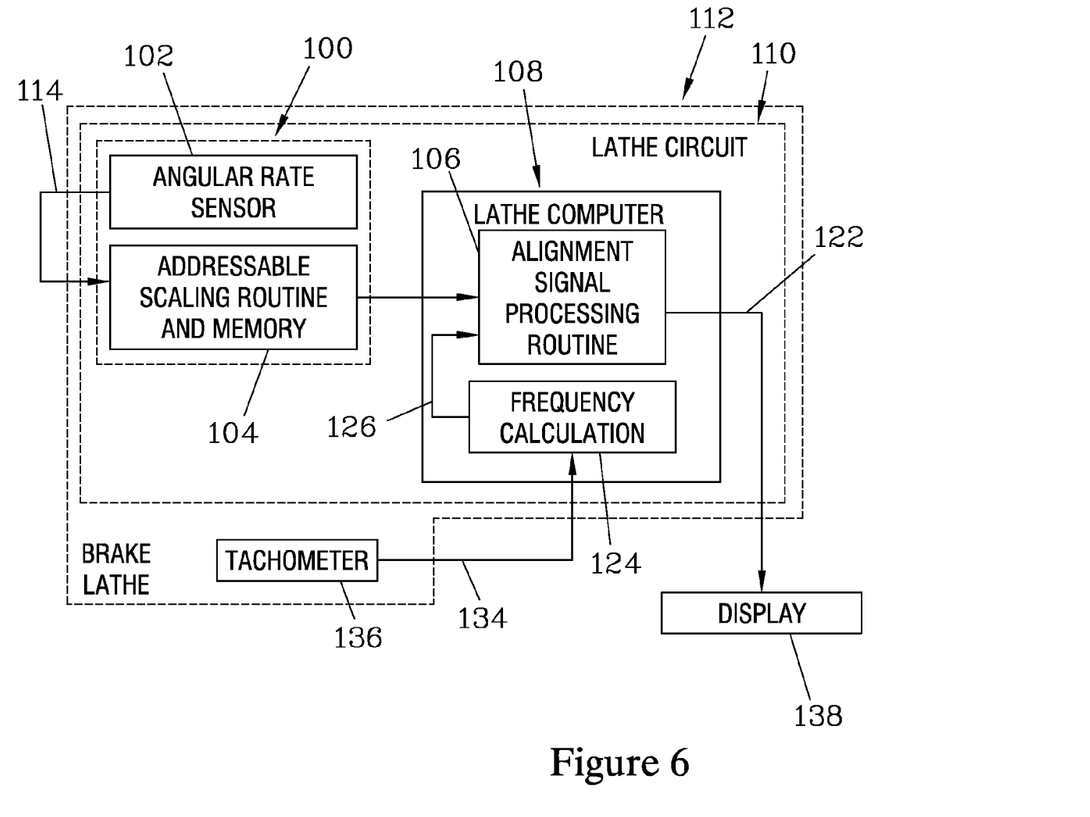
FIG. 6 shows the composite angular rate sensor shown in FIG. 5 where the lathe circuit that includes the angular rate sensor and its associated addressable scaling routine and memory has been integrated into a lathe system to allow the alignment signal processing routine to provide an accurately proportional derived value for the lateral runout due to misalignment of the lathe.

FIGS. 5 and 6 are schematic illustrations showing one embodiment of a high resolution composite angular rate sensor 100 that combines an angular rate sensor 102 of the Coriolis type with an addressable scaling routine and memory 104 for use by an alignment signal processing routine 106 performed by a lathe computer 108. In the embodiment illustrated in FIGS. 5 and 6, the lathe computer 108 is provided on a lathe circuit 110 on which the angular rate sensor 102 is also mounted. FIG. 5 shows one approach for calibrating the composite angular rate sensor 100 to adjust the value stored in the memory of the adjustable scaling routine 104 so as to provide an appropriately calibrated signal that will be consistent from composite angular rate sensor to composite angular rate sensor, while FIG. 6 shows the composite angular rate sensor 100 when in service in an on-vehicle disk brake lathe 112 (schematically shown in FIG. 6). In the schematic views of FIGS. 5 and 6, the addressable scaling routine 104 is illustrated as operating on an angular rate signal 114 generated by the angular rate sensor 102 prior to its processing by the alignment signal processing routine 106; however, it should be appreciated that the addressable scaling routine could be incorporated into the alignment signal processing routine or could operate on the output of the alignment signal processing routine.

To determine the appropriate value to be stored in the memory of the adjustable scaling routine 104, the lathe circuit 110 is attached to a calibration jig 116 which is designed to provide a consistent angular motion when powered by a motor; a calibration tachometer 118 provides a tachometer signal 120 responsive to the motor speed. The tachometer signal 120 and the angular rate signal 114 generated by the angular rate sensor 102 are provided to the lathe computer 108, which uses the alignment signal processing routine 106 to derive an alignment indication signal 122 that is proportional to a LRO value corresponding to the motion of the calibration jig 116. The lathe computer 108 typically includes a frequency calculator 124 (as shown in FIG. 6), operating on the signal from a tachometer incorporated into the lathe) to convert the tachometer signal 120 to a frequency signal 126 for use by the alignment signal processing routine 106. Initially, the scale value stored in the memory can be set to an appropriate default value, such as one.

Since the calibration jig 116 is designed to provide a consistent angular motion, the lateral runout of such motion can be measured, typically by use of a displacement gauge placed at a specified radius, to provide a known lateral runout value for the calibration jig 116. A calibration computer 128 is provided, which receives the alignment indication signal 122 from the alignment signal processing routine 106. The calibration computer 128 uses a calibration algorithm 130 to compare the derived LRO value indicated by the alignment indication signal 122 to the known lateral runout of the calibration jig 116, and to determine how much the alignment indication signal 122 should be scaled to match the derived LRO value to a specified proportion of the known value. For such a calibration scheme, it can be helpful for the alignment indication signal 122 to be scaled so as to correspond to the radius at which the lateral runout of the calibration jig 116 is measured to simplify the comparison; if the radius of measurement on the calibration jig 116 differs from the typical radius for measuring lateral runout on a brake disk, then the alignment indication signal 122 can be subsequently scaled accordingly before being displayed to the operator when the lathe circuit 110 is in service in the lathe 112. In any case, once the calibration computer 128 has calculated an appropriate value to be employed by the addressable scaling routine 104 so as to make the lateral runout value indicated by the alignment indication signal 122 closely match the known lateral runout of the calibration jig 116, the calibration computer 128 writes this value into the memory of the addressable scaling routine 104 via a calibration interface 132. The value stored in the memory of the addressable scaling routine 104 is thereafter used to scale the angular rate signal 114 when processed by the alignment signal processing routine 106 to generate the alignment indication signal 122 from the tachometer signal 120 and the angular rate signal 114, and the calibration computer 128 uses the calibration algorithm 130 to compare the new alignment indication signal 122 against the known LRO value, and again adjusts the value stored in the memory of the addressable scaling routine 104 if necessary. In this manner, the value stored in the memory of the addressable scaling routine 104 can be iteratively adjusted via the calibration interface 132 until the derived LRO value indicated by the alignment indication signal 122 closely matches the specified proportion of the known lateral runout provided by the calibration jig 116. Since the parameter of interest is the amplitude of the change in the signal, it is not necessary for the calibration to be done at the same rotational speed for which the composite angular rate sensor 100 is designed to operate in service.

When the lathe circuit 110 that includes the composite angular rate sensor 100 is placed into service on the disk brake lathe 112, the alignment signal processing routine 106 uses the angular rate signal 114, appropriately scaled by the addressable scaling routine 104 using the value stored in its memory, and a tachometer signal 134 from a tachometer 136 that is positioned to respond to the rotation speed of the lathe 112 to provide the alignment indication signal 122 that is a proportional lateral runout value corresponding to the current alignment condition of the lathe 112, and this lateral runout value is displayed to the operator on a display 138.

While alternative calibration schemes could be employed to set an appropriate scaling factor in the memory of the addressable scaling routine 104, the above scheme offers the advantage that the calibration computer 128 can be configured to also test the lathe circuit 110 for proper functioning to ease fabrication of the lathe 112 that incorporates the system of the present invention.

Figure 7:
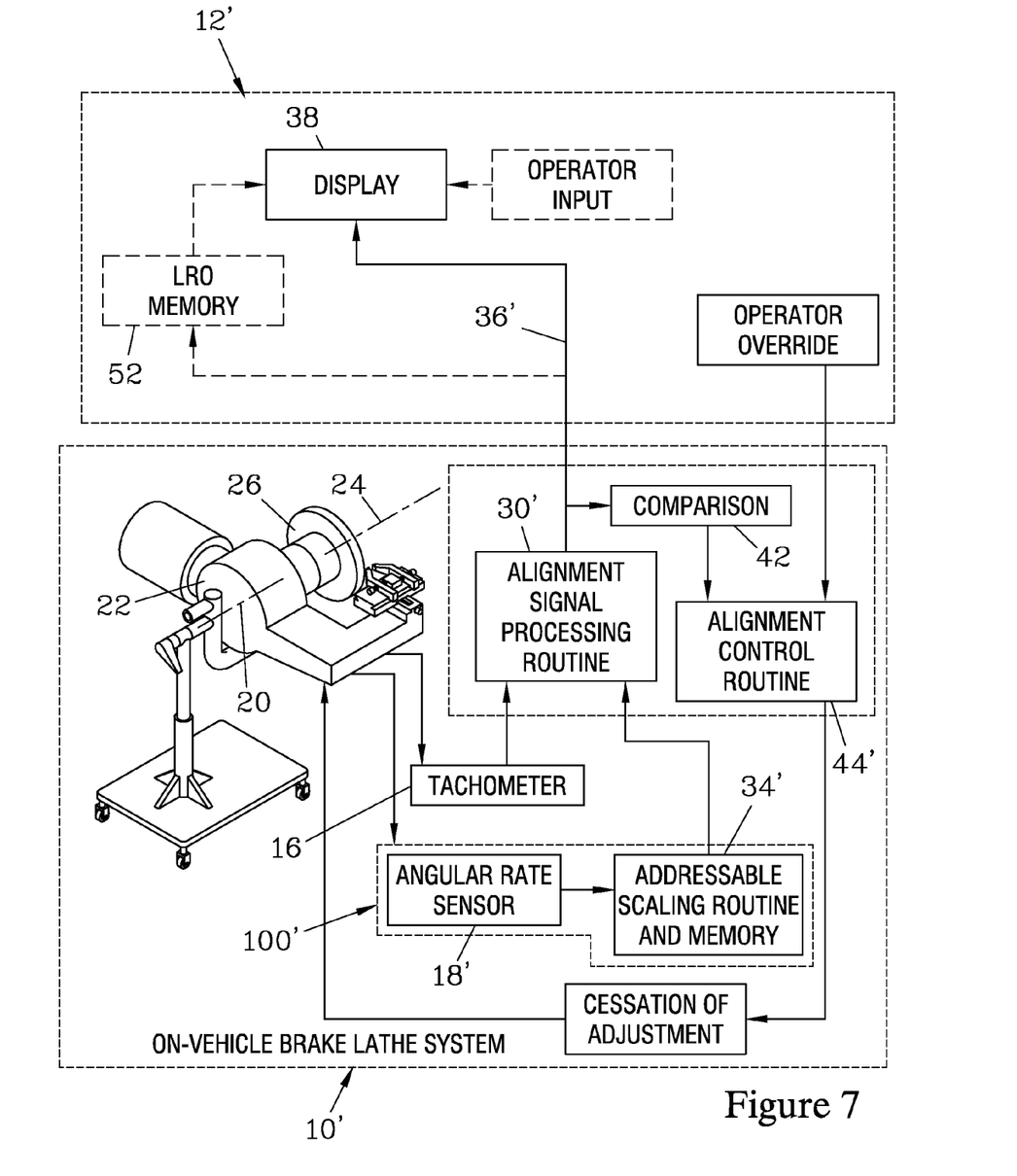
FIGS. 7-9 illustrate alternative embodiments which provide a display of the current state of alignment for at least a short time after cessation of the adjustment has been caused by the operator employing the operator override. In the event that the alignment has changed since it was last presented to the operator and used as the basis for the operator acting to interrupt the alignment process, this extended display period displays the current value after the operator's intervention to provide the operator notice in the event that the misalignment has changed since last presented.

FIG. 7 illustrates a modified lathe system 10' and a dynamic alignment monitoring and operator intervention system 12', where a composite angular rate sensor 100' is employed that includes a Coriolis type angular rate sensor 18' and an associated addressable scaling routine with memory 34' that stores an appropriate individual scaling factor in memory for use with that particular angular rate sensor 18', in a manner similar to that described in the discussion of FIGS. 5 and 6. Again, while the addressable scaling routine 34' is schematically shown as operating on the signals from the angular rate sensor 18' prior to processing by the alignment signal processing routine 30', the routines (34', 30') could be integrated.

In this embodiment, the signals from the composite angular rate sensor 100' and from the tachometer 16 are converted into a lateral runout value by the alignment signal processing routine 30' using the addressable scaling routine 34' to provide an alignment indication signal 36' which is an accurately proportioned derived value for the lateral runout, which in turn is provided to the comparison routine 42 and to the display 38, and can be provided to other destinations such as the optional LRO memory 52.

In addition to the use of the composite angular rate sensor 100', this embodiment differs in that the alignment control routine 44' does not provide any instruction to suppress the signals associated with the composite angular rate sensor 100' and the tachometer 16 to cease display of the current derived LRO value on the display 38. Thus, the derived LRO value continues to be presented on the display 38 even after any adjustment of the alignment between the disk axis 20 and the lathe axis 24 has been discontinued. Such continued display can be helpful in letting the operator know in the event that the lateral runout in the disk 26 before machining is so great as to cause the lathe 22 to deviate from machining the surfaces of the disk 26 along a path normal to the disk axis 24, in which case a second machining operation should be performed. However, since the operator cannot adjust the alignment condition during the machining process, it is generally preferred to cease monitoring of the alignment once the actual machining procedure has started.

Figure 8:
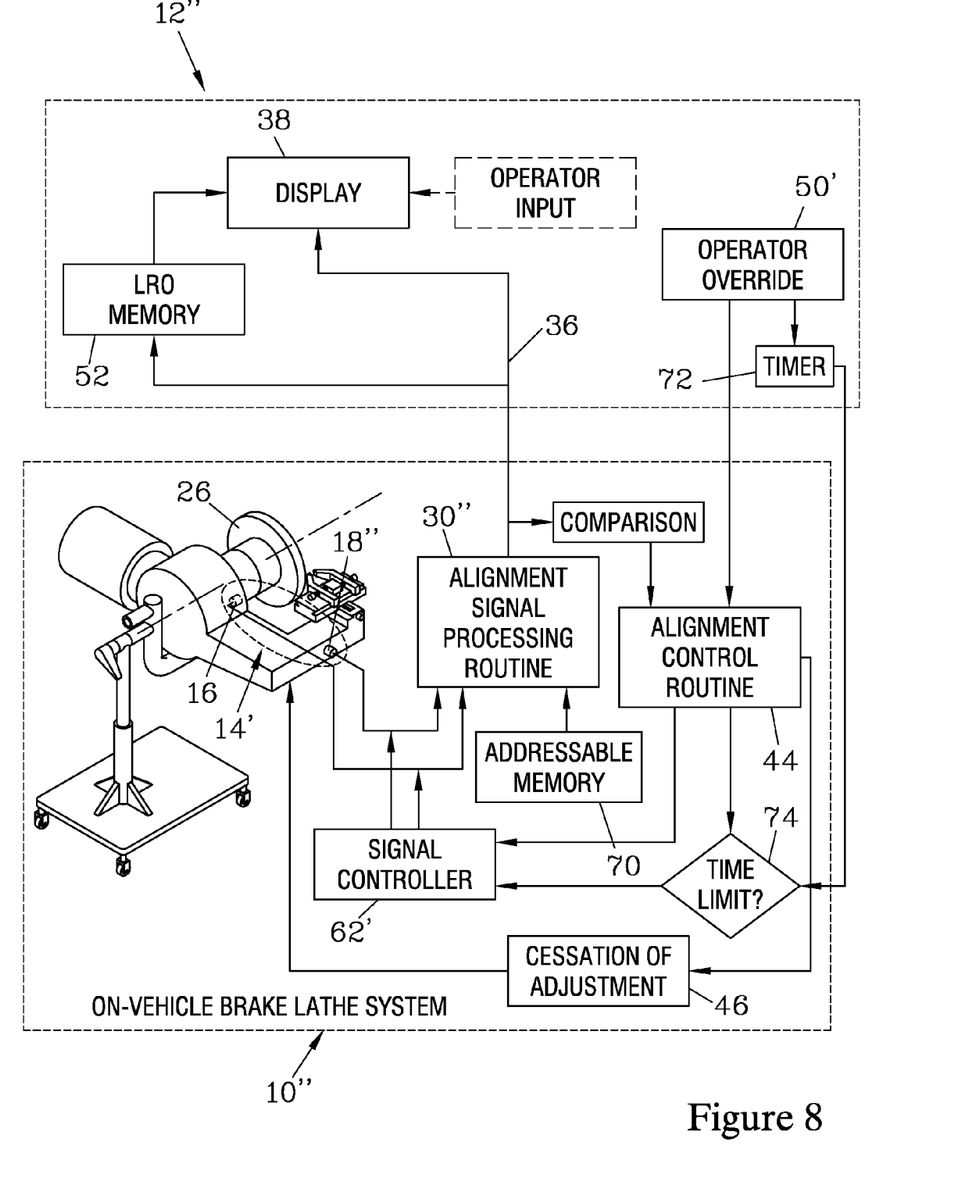

FIG. 8 illustrates a lathe system 10" and a dynamic alignment monitoring and operator intervention system 12" which provides continuing monitoring of the alignment only for a discrete period of time after the operator override 50' has been activated to assure that, at the time of cessation of adjustment, the operator is provided notice as to whether or not the alignment remains within specification for the lateral runout. If not, the operator will be on notice that the alignment is not sufficient and that the alignment procedure should be restarted before continuing on to the machining of the brake disk 26.

In this embodiment, the character of each individual angular rate sensor 18" has a very predictable output, but where the output varies from sensor to sensor. In this embodiment, a scaling routine (not shown) is integrated into the alignment signal processing routine 30". To handle the differences from sensor to sensor, an addressable memory 70 is provided to allow adjustment of the scaling routine.

The monitoring and intervention system 12" shown in FIG. 8 includes a timer 72 that is set upon the activation of the operator override 50'. The timer 72 counts the elapsed time since it has been set, and a time checking routine 74 is provided to check the time elapsed since the timer 72 was started. Until such time as a predetermined time interval has elapsed, signals from the alignment sensors 14' continue to be provided to the alignment signal processing routine 30" for processing to provide the alignment indication signal 36 for presentation on the display 38. The predetermined period of time is selected to be sufficient to assure that any alignment changes that occur subsequent to the presentation of the alignment and the action taken by the operator using the operator override 50' are indicated, and thus there is no need to continue reporting the alignment beyond this time period. Thus, when the operator activates the operator override 50', the alignment control routine 44 immediately causes activation of the cessation of adjustment routine 46, but the alignment sensors 14' remain active and the current derived LRO value continues to be represented on the display 38 until a sufficient time has elapsed to assure that the alignment adjustments have ceased and the alignment remains in a steady condition. Once the timer 72 reaches the set period, then the presentation of the signals from the alignment sensors 14' is suppressed by the signal controller 62'. However, while the derived LRO value is no longer updated to provide the operator with a real-time representation of the current alignment condition, the LRO memory 52 can be included to allow the derived LRO value at the time that the signals are suppressed to continue to be presented on the display 38 for reference by the operator. It should be noted that, if the operator override 50' is not employed and the alignment process continues until the comparison results in automatic cessation of adjustment of the alignment by the alignment control routine 44, the signals from the alignment sensors 14' are typically suppressed at that time, since no further adjustments will occur.

Figure 9:
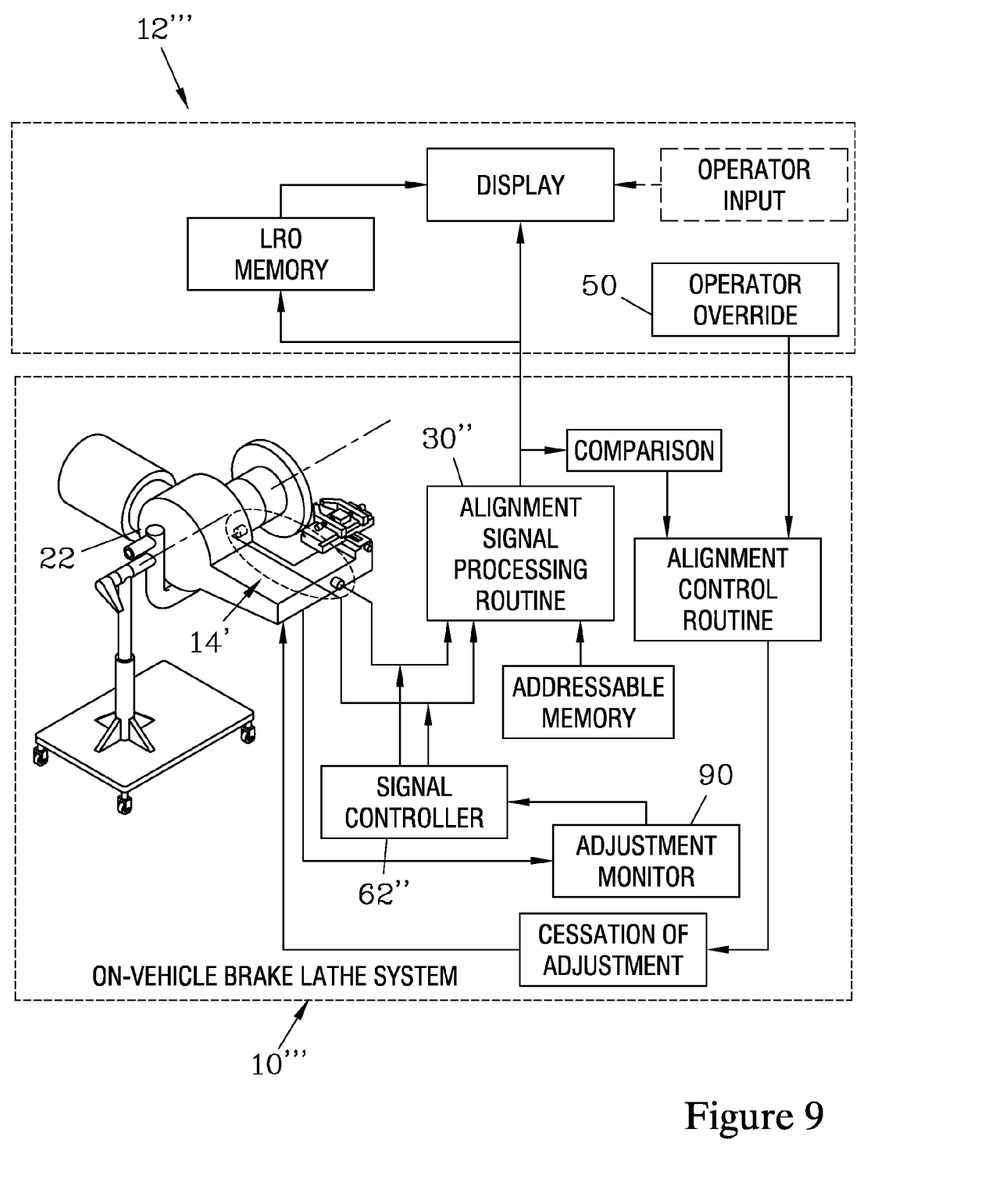

FIG. 9 illustrates an embodiment that is similar to that of FIG. 8 and differs in that it employs an alternative approach to avoiding the risk of the alignment jumping out of specifications without notice to the operator after the operator has decided to cease further alignment adjustment using the operator override 50. In the lathe system 10''', an adjustment monitor 90 is placed on the alignment mechanism of the brake lathe 22, the adjustment monitor 90 providing a signal responsive to whether an adjustment has been made within a specified time period. When no adjustment has been made for the specified time period, which is selected to be somewhat greater than the maximum time between adjustments of the alignment mechanism while actively adjusting the alignment to automatically reduce the misalignment, the adjustment monitor 90 acts to trigger a signal controller 62" to suppress the signals from the alignment sensors 14'. The scheme illustrated in FIG. 9 results in the real time representation of the current derived LRO value provided by the alignment signal processing routine 30''' operating on the signals from the alignment sensors 14' being discontinued after a time period regardless of whether the alignment has ceased automatically or due to the operator overriding the automatic adjustment process; the signals from the alignment sensors 14' are activated again when a new alignment procedure is started.

Figure 10:
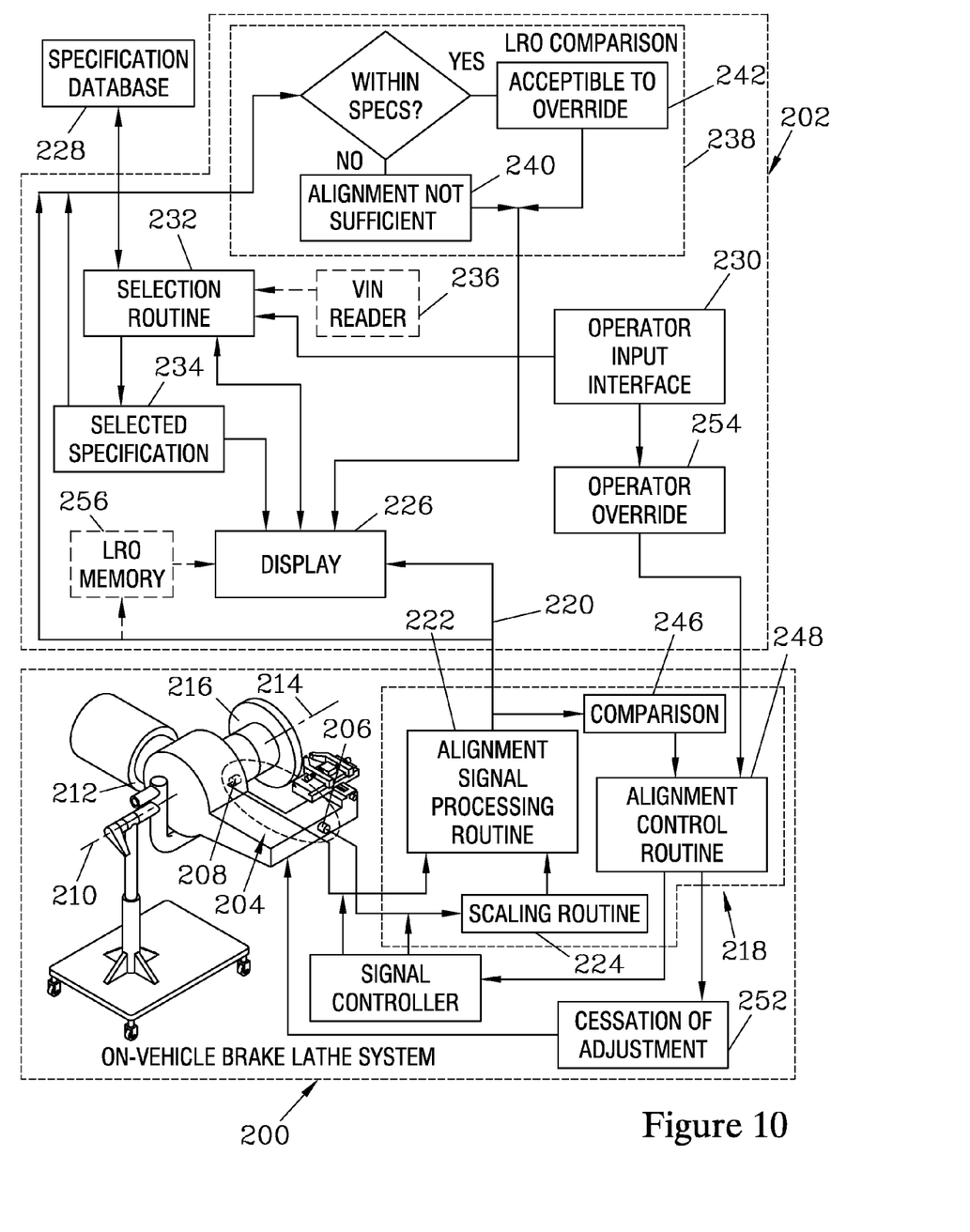
FIG. 10 is a schematic representation of a dynamic alignment monitoring and operator intervention system that communicates with a database and has an operator selection routine to allow the operator to select the appropriate specification values from the database for the vehicle and wheel having the brake resurfaced. These values from the database are then compared to the current LRO value measured and the results of the comparison communicated to the display to help guide the operator in making a decision as to whether to continue the alignment process.

FIG. 10 illustrates another embodiment of the present invention, an on-vehicle disk brake lathe system 200 that operates with a dynamic alignment monitoring and operator intervention system 202, which shares many of the features of the embodiment shown in FIG. 1 but which provides more sophisticated assistance for an operator in determining whether it appears appropriate to discontinue refinement of the alignment. The on-vehicle disk brake lathe system 200 has alignment sensors 204 (which include an angular rate sensor 206 and a tachometer 208) which monitor the misalignment between a lathe axis 210 of an on-vehicle disk brake lathe 212 and a disk axis 214 of a brake disk 216 as a function of time. The alignment sensors 204 provide signals to a lathe computer 218 which provides an alignment indication signal 220 via an alignment signal processing routine 222, the alignment signal processing routine 222 employing a scaling routine 224 which, as illustrated, operates on the signal from the angular rate sensor 206 prior its being processed by the alignment signal processing routine 222 to appropriately scale the alignment indication signal 220 so as to be accurately proportional to the LRO value that would result from machining the brake disk 216.

The derived LRO value indicated by the alignment indication signal 220 is presented to the operator by a display 226, along with additional information that allows the operator to determine when it is appropriate to stop the alignment process without the need to refer to supplemental information.

In this embodiment, the dynamic alignment monitoring and operator intervention system 202 communicates with a vehicle specification database 228 which contains the specification data associated with lateral runout parameters for the vehicles likely to be serviced. This data is accessible to the operator via an operator input interface 230 operating in conjunction with a selection routine 232 and the display 226. In this embodiment, the display 226 includes a screen, and the selection routine 232 provides the operator the ability to scroll through the model information contained in the specification database 228. The operator interface 230 allows the operator to scroll the vehicle model onto the screen and use the selection routine 232 to select the appropriate model and to specify whether the disk 216 is for a front wheel or a rear wheel in order to obtain a selected alignment specification 234 from the information contained in the specification database 228. To aid in selecting the vehicle, a VIN code reader 236 can optionally be provided to allow the operator to read the VIN of the vehicle, when such is provided on the vehicle in the form of a bar code or similar machine readable format; this should automatically provide the appropriate make, model, and year of the vehicle, so that the operator need only select the appropriate submodel, if necessary, and the wheel position for the disk 216.

Once the model and wheel position have been selected, the selected alignment specification 234 corresponding to this vehicle and wheel position is extracted from the database 228 and sent to an LRO comparison routine 238, and can also be represented on the display 226 for visual comparison with the current derived LRO value by the operator. The LRO comparison routine 238 also receives the current derived LRO value indicated by the alignment indication signal 220 provided by the alignment signal processing routine 222, and makes a comparison to see whether the derived LRO value is greater or less than the maximum allowable value for the particular vehicle and wheel position as indicated by the selected alignment specification 234. In the event that the derived LRO value is greater than the maximum allowable value selected, then an "Alignment Not Sufficient" flag 240 is set and notice of such is provided to the display 226. Similarly, if the current derived LRO value is less than or equal to the maximum allowable value, an "Acceptable to Override" flag 242 is set and notice of such is provided to the display 226. In either case, as long as the derived LRO value continues to change, the LRO comparison routine 238 continues to operate to set the appropriate flag (240 or 242) to provide the appropriate notice for presentation on the display 226.

Figure 11:
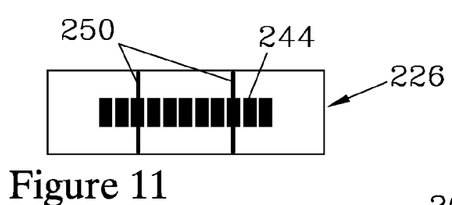
Figure 12:
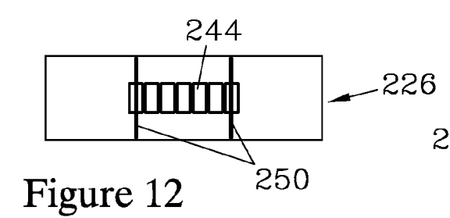

The display 226 provides the operator with an indication of which flag (240 or 242) has most recently been set by the LRO comparison routine 238. Such indication could be by providing a visual and/or audio signal to the operator. One example of such indication is shown in FIGS. 11 and 12, where the display 226 provides a representation of the current derived LRO value to the operator in the form of a bar graph 244, with the magnitude of the derived LRO value being represented by the width of the bar and the color of the bar changing to indicate which flag (240 or 242) has been set. FIG. 11 illustrates the display 226 at a time where the derived LRO value is greater than the maximum allowable value selected, and thus the "Alignment Not Sufficient" flag 240 has been set by the LRO comparison routine 238. In this case, the bar graph 244 displays the magnitude of the derived LRO value with a bar of a first color, such as red. When the derived LRO value falls within the selected maximum allowable value specifications, the LRO comparison routine 238 sets the "Acceptable to Override" flag 242, and the display 226 changes the color of the bar graph 244 to a second color, such as green, to provide notice to the operator that the "Acceptable to Override" flag 242 has been set.

FIGS. 11 and 12 also show the display 226 providing an indication of how the current derived LRO value indicated by the alignment signal 220 compares to a default acceptable LRO value which is used by a comparison routine 246 and an alignment control routine 248 (both shown in FIG. 10) in determining when to automatically cause the alignment process to cease. In the display 226, this default acceptable LRO value is indicated by markers 250 which are positioned at a separation from the center that corresponds to the width of the bar graph 244 that corresponds to the default acceptable LRO value; thus, if the current derived LRO value is the same as the default value, the width of the bar graph 244 is the same as the separation of the markers 250. As shown in FIG. 12, the misalignment of the axes (210, 214) has not yet reached a sufficiently small degree to meet the default acceptable LRO value which would cause the alignment control routine 248 to activate a cessation of adjustment routine 252, and the width of the bar graph 244 representing the magnitude of the current derived LRO value is therefore greater than the separation between the markers 250. However, while the current derived LRO value is greater than the default acceptable LRO value, it is less than the maximum allowable value for the particular vehicle and wheel position being serviced, and thus the bar graph 244 is presented in the second color, indicating to the operator that the "Acceptable to Override" flag 242 has been set and that it would be appropriate to activate an operator override 254 (shown in FIG. 10) which instructs the alignment control routine 248 to activate the cessation of adjustment routine 252 to stop further adjustment of the alignment of the axes (210 and 214).

Figure 13:
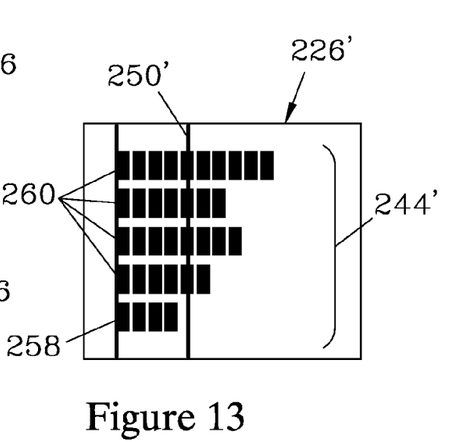

Further information for the operator can be provided when the monitoring and intervention system 202 includes an LRO memory 256 (shown in FIG. 10), in which case an alternate display 226' such as shown in FIG. 13 can be employed to provide an indication of the current derived LRO value as well as several previous derived LRO values, thereby providing the operator an indication as to whether the derived LRO values appear to be converging. The display 226' provides a composite bar graph 244' that includes a current LRO value bar 258, the width of which extending from the left side is proportional to the magnitude of the current derived LRO value, as well as four previous LRO value bars 260 having widths proportional to the preceding derived LRO values. A goal indicator 250' can also be displayed, which indicates the default acceptable LRO value. A goal indicator could also indicate the maximum acceptable LRO value indicated by the selected alignment specification 234 for the particular vehicle model and wheel selected, either alone or in addition to the default acceptable LRO value goal indicator 250' shown in FIG. 13. Similarly, the display 226' could use the color of the current LRO value bar 258 or other visual indicator to provide notice to the operator as to the acceptability of the current derived LRO value.

Figure 14:
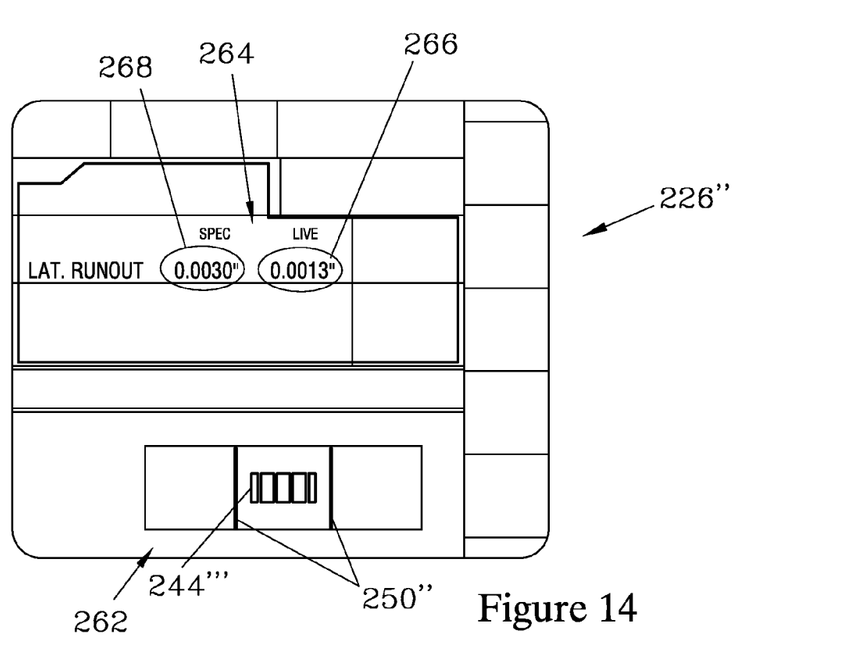

While FIGS. 11-13 illustrate graphical displays which can aid the operator in determining when it is appropriate to use the operator override 254 to stop the automatic adjustment procedure, it is typically preferred to also provide a numerical representation of the derived LRO value on the display 226. FIG. 14 illustrates a display 226" that includes a graphic portion 262 as well as a numerical portion 264. The graphic portion 262 shows a bar graph 244" having a width proportional to the current derived LRO value, and markers 250" having a separation proportional to the default LRO value. The numerical portion 264 has a numerical real-time presentation 266 of the derived LRO value, appropriately scaled to correspond to the lateral runout at the radius typically employed when evaluating brake disks, as well a numerical reference presentation 268 indicating the specification LRO value for the particular vehicle being serviced.

Figure 15:
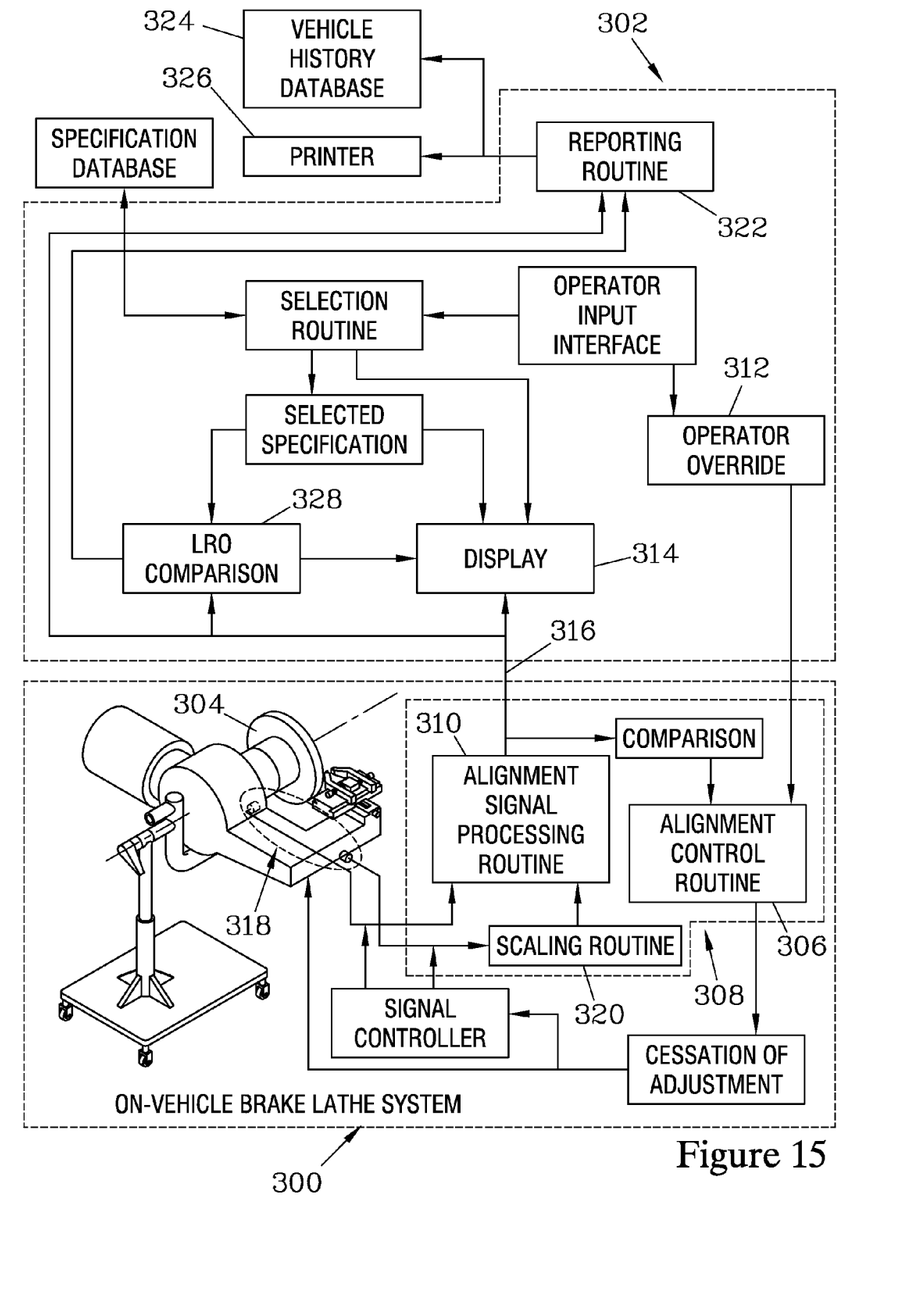
FIG. 15 is a schematic illustration of an on-vehicle disk brake lathe system and a dynamic alignment monitoring and operator intervention system that are similar to those shown in FIG. 10, but where the dynamic alignment monitoring and operator intervention system reports the derived LRO value used when machining a brake disk to a vehicle history database and/or to a printer.

FIG. 15 is a schematic illustration of an on-vehicle disk brake lathe system 300 and a dynamic alignment monitoring and operator intervention system 302 that are similar to the lathe system 200 and the monitoring and intervention system 202 shown in FIG. 10 with the additional feature that the derived LRO value used when machining a brake disk 304 is reported to provide a record of the machining operation. The lathe system 300 again has an alignment control routine 306 for stopping the alignment process, either when a lathe computer 308 determines that the output provided by an alignment signal processing routine 310 indicates that the misalignment is below a specified threshold, or when an operator override 312 is activated by the operator. In the latter case, such is done in response to a presentation on a display 314 of a derived LRO value indicated by an alignment indication signal 316 provided by the alignment signal processing routine 310 operating on signals from alignment sensors 318 in cooperation with a scaling routine 320. In either case, when the alignment control routine 306 causes cessation of the alignment process, the current derived LRO value indicated by the alignment indication signal 316 is provided to a reporting routine 322. As discussed above with regard to FIGS. 7-9, signals from the alignment sensors 318 can continue to be processed by the alignment signal processing routine 310 for at least a short time to allow the derived LRO value to be presented on the display 314 after the operator override 312 is activated to assure that the current derived LRO value accurately represents the state of alignment after all adjustments have ceased; this assures that the current LRO value that is provided to the reporting routine 322 accurately represents the alignment condition which exists when the brake disk 304 is machined.

The reporting routine 322 provides the derived LRO value as a record of the calculated LRO of the brake disk 304 after it has been machined. The LRO value can then be provided as part of a record of the machining operation and may, for example, be provided for recording in a vehicle history database 324 which records data for the particular vehicle being serviced, and/or sent to a printer 326 to provide a printed record of the machining operation. The information provided to the reporting routine 322 can also include the results from an LRO comparison routine 328, which can be similar to the LRO comparison routine 238 shown in FIG. 10 and discussed above, to provide a record of whether or not the derived LRO value used results in the machined brake disk 304 meeting the selected specifications for the particular vehicle and wheel position.

While the novel features of the present invention have been described in terms of particular embodiments and preferred applications, it should be appreciated by one skilled in the art that substitution of materials and modification of details can be made without departing from the spirit of the invention.

What we claim is:

1. A dynamic alignment monitoring system for an on-vehicle disk brake lathe system having an alignment mechanism for reducing misalignment between a lathe axis and a hub axis about which a brake disk rotates, the dynamic alignment monitoring system comprising:
   an angular rate sensor for providing an angular rate signal responsive on a time-dependent basis to angular motion resulting from the misalignment;
   a tachometer providing a tachometer signal responsive to the speed of rotation of the lathe;
   an alignment signal processing routine that operates on the signals generated by said angular rate sensor and said tachometer to provide a time-dependent output;
   a scaling routine for processing the angular rate signal so as to allow said alignment signal processing routine to provide a derived lateral runout (LRO) value for the brake disk which would result from machining under the current misalignment condition;
   a display for presenting a representation of the derived LRO value in a time-dependent manner; and
   an alignment control routine for operating the alignment mechanism to reduce the misalignment in response to the time-dependent output of said alignment signal processing routine,
      said alignment control routine acting to stop the alignment mechanism and maintain the alignment of the lathe axis relative to the hub axis when the time-dependent output indicates that the state of misalignment is below a predetermined value.

2. The dynamic alignment monitoring system of claim 1 wherein the system allows for the intervention of an operator thus providing a dynamic alignment monitoring and operator intervention system, the system further comprising:
   an operator override for allowing an operator of the lathe system to optionally disengage the alignment mechanism and maintain the alignment of the lathe axis relative to the hub axis when determined by the operator to be appropriate 3. The dynamic alignment monitoring and operator intervention system of claim 1 wherein said display presents a numerical representation of the derived LRO value as a function of time.

4. The dynamic alignment monitoring and operator intervention system of claim 3 further comprising:
   a LRO memory for storing at least one recent previous of the derived LRO value,
      wherein said display is configured to also display a representation of said at least one recent previous value of the derived LRO value.

5. The dynamic alignment monitoring and operator intervention system of claim 4 wherein said display presents a numerical representation of the derived LRO value as a function of time and a numerical representation of the at least one recent previous value of the derived LRO value.

6. The dynamic alignment monitoring and operator intervention system of claim 3 further comprising:
   a signal converter for converting the derived LRO value into a graphic representation of the derived LRO value, wherein said display for representing the derived LRO value in a time-dependent manner additionally presents a graphical representation of the current derived LRO value in a time-dependent manner.

7. The dynamic alignment monitoring and operator intervention system of claim 2 further comprising:
an operator input interface for allowing the operator to provide to said display a target value in numeric form of the acceptable upper limit of the runout; and
further wherein said display provides for viewing of the current derived LRO value and the target value,
thereby providing the opportunity to make a real time comparison of the current derived LRO value to the target value.

8. The dynamic alignment monitoring and operator intervention system of claim 7 further comprising:
a database interface for communicating with a database containing vehicle alignment specification information indexed by vehicle model and wheel position, and
further wherein said operator interface has a selection routine that allows the operator to select the appropriate entry from the database to provide the target value for display.

9. The dynamic alignment monitoring and operator intervention system of claim 8 further comprising:
a bar code reader for reading the VIN of a vehicle being serviced,
wherein the VIN is used to complement the input provided through said operator interface to make the selection from the database of the appropriate target value for display.

10. The dynamic alignment monitoring and operator intervention system of claim 8 further comprising:
a signal converter for converting the derived LRO value into a graphic representation of the derived LRO value, wherein said display is configured to graphically represent the current derived LRO value in a time-dependent manner and to graphically represent the target value in juxtaposition to the graphic representation of the derived LRO value.

11. The dynamic alignment monitoring and operator intervention system of claim 7 further comprising:
a reporting routine for reporting the derived LRO value used for machining the brake disk.

12. The dynamic alignment monitoring and operator intervention system of claim 1 wherein said angular rate sensor is a Coriolis effect angular rate sensor and said scaling routine is an addressable scaling routine with an associated memory that is dedicated to said angular rate sensor, said addressable scaling routine processing the angular rate signal using an individual scaling factor that is associated with said angular rate sensor and stored in said associated memory.

13. The dynamic alignment monitoring and operator intervention system of claim 12 wherein said Coriolis effect angular rate sensor is selected from a group of sensors having a standard deviation $\sigma$ not more than about 7.5% of the signal level generated when the misalignment between the lathe axis and the hub axis is sufficiently small as to result in a lateral runout in the machined brake disk of about 0.001" measured at a radius of six inches from the hub axis.

14. The dynamic alignment monitoring and operator intervention system of claim 13 further comprising:
a calibration interface for entering the individual scaling factor into said associated memory of said addressable scaling routine.

15. The dynamic alignment monitoring and operator intervention system of claim 2 wherein the representation of the current derived LRO value is displayed after said operator override has been activated to assure compliance of the alignment after the operator has intervened.

16. The dynamic alignment monitoring and operator intervention system of claim 2 wherein said alignment control routine operates the alignment mechanism in response to the derived LRO value.

17. A composite angular rate sensor for monitoring misalignment between a lathe axis and a hub axis in an on-vehicle disk brake lathe system used to machine a brake disk, the composite angular rate sensor comprising:
a Coriolis effect angular rate sensor that generates an angular rate signal responsive to angular motion caused by the axial misalignment between the lathe axis and the hub axis when the lathe is operated;
an addressable scaling routine having a memory associated with said Coriolis effect angular rate sensor for storing an individual scaling factor to be employed by said addressable scaling routine to scale the angular rate signal to obtain a calibrated alignment signal that is proportional to the lateral runout that would be created in the machined brake disk due to the misalignment; and
a calibration interface for entering the individual scaling factor into said memory.

18. The composite angular rate sensor of claim 17 wherein said Coriolis effect angular rate sensor is selected from a group of sensors having a standard deviation $\sigma$ not more than about 7.5% of the level of the angular rate signal generated when the misalignment between the lathe axis and the hub axis is sufficiently small as to result in a lateral runout in the machined brake disk of about 0.001" measured at a radius of six inches from the hub axis.

* * * * *